US009546553B2

United States Patent
Okita et al.

(10) Patent No.: US 9,546,553 B2
(45) Date of Patent: Jan. 17, 2017

(54) FILM COOLING STRUCTURE AND TURBINE BLADE

(71) Applicant: IHI Corporation, Tokyo (JP)

(72) Inventors: Yoji Okita, Tokyo (JP); Chiyuki Nakamata, Tokyo (JP); Seiji Kubo, Tokyo (JP); Osamu Watanabe, Tokyo (JP)

(73) Assignee: IHI CORPORATION (JP)

( * ) Notice: Subject to any disclaimer, the term of this patent is extended or adjusted under 35 U.S.C. 154(b) by 352 days.

(21) Appl. No.: 14/265,897

(22) Filed: Apr. 30, 2014

(65) Prior Publication Data

US 2014/0234121 A1    Aug. 21, 2014

Related U.S. Application Data

(63) Continuation of application No. PCT/JP2012/078953, filed on Nov. 8, 2012.

(30) Foreign Application Priority Data

Nov. 9, 2011    (JP) .................................. 2011-245704

(51) Int. Cl.
*F01D 5/18*    (2006.01)
*F01D 9/04*    (2006.01)
(Continued)

(52) U.S. Cl.
CPC .............. *F01D 5/186* (2013.01); *F01D 9/041* (2013.01); *F02C 7/12* (2013.01); *F23R 3/06* (2013.01);
(Continued)

(58) Field of Classification Search
CPC ............ F01D 5/186; F01D 9/041; F02C 7/12; F05D 2240/303; F05D 2260/202; F23R 2900/03042; F23R 3/06
(Continued)

(56) References Cited

U.S. PATENT DOCUMENTS

| | | | |
|---|---|---|---|
| 5,062,768 A * | 11/1991 | Marriage | F01D 5/186 29/889.721 |
| 7,296,967 B2 * | 11/2007 | Shapiro | F01D 11/08 415/115 |

(Continued)

FOREIGN PATENT DOCUMENTS

| | | |
|---|---|---|
| EP | 0 375 175 A1 | 6/1990 |
| EP | 0 501 813 A1 | 9/1992 |

(Continued)

OTHER PUBLICATIONS

Search Report dated Jun. 2, 2015 issued in corresponding European Patent Application No. 12846841.0.

(Continued)

*Primary Examiner* — William McCalister
(74) *Attorney, Agent, or Firm* — Ostrolenk Faber LLP (57) ABSTRACT

The film cooling structure includes: a wall surface along which a heating medium flows; and at least one pair of film cooling holes that open at the wall surface and that blow a cooling medium. The pair of film cooling holes are arranged to be adjacent to each other in a main flow direction of the heating medium. In addition, perforation directions of the pair of film cooling holes are set such that directions of swirls of the cooling medium formed by blowing are opposite to each other, a swirl of the cooling medium on a downstream side in the main flow direction is mixed and merged with another swirl of the cooling medium on an upstream side in the main flow direction, and the merged cooling medium flows along the wall surface in a direction intersecting with the main flow direction.

8 Claims, 8 Drawing Sheets

(51) Int. Cl.
  *F02C 7/12* (2006.01)
  *F23R 3/06* (2006.01)
(52) U.S. Cl.
  CPC ... *F05D 2240/303* (2013.01); *F05D 2260/202* (2013.01); *F23R 2900/03042* (2013.01)
(58) Field of Classification Search
  USPC .............................................. 416/97 R, 97 A
  See application file for complete search history.

(56) References Cited

U.S. PATENT DOCUMENTS

| | | | | |
|---|---|---|---|---|
| 7,597,540 | B1 * | 10/2009 | Liang | F01D 5/186 416/97 R |
| 8,011,890 | B2 * | 9/2011 | Walters | F01D 5/186 416/97 R |
| 8,317,473 | B1 * | 11/2012 | Liang | F01D 5/186 416/228 |
| 8,371,814 | B2 * | 2/2013 | Ramachandran | F01D 5/186 415/115 |
| 2006/0002796 | A1 * | 1/2006 | Bolms | F01D 5/186 416/97 R |

FOREIGN PATENT DOCUMENTS

| | | |
|---|---|---|
| EP | 1 788 193 A2 | 5/2007 |
| JP | 10-054203 | 2/1998 |
| JP | 2007-138794 | 6/2007 |
| JP | 4147239 | 9/2008 |
| JP | 2011-196360 | 10/2011 |

OTHER PUBLICATIONS

International Search Report and Written Opinion mailed Feb. 5, 2013 in corresponding PCT International Application No. PCT/JP2012/078953.

* cited by examiner

FILM COOLING STRUCTURE AND TURBINE BLADE

This application is a Continuation Application based on International Application No. PCT/JP2012/078953, filed Nov. 8, 2012, which claims priority on Japanese Patent Application No. 2011-245704, filed Nov. 9, 2011, the contents of both of which are incorporated herein by reference.

TECHNICAL FIELD

The present invention relates to a film cooling structure and a turbine blade.

BACKGROUND ART

Patent Document 1 discloses a film cooling structure in which blow holes (film cooling holes) are formed on a wall surface of a rotor blade of a gas turbine or of a liner of a combustor, wherein the wall surface faces high-temperature gas (heating medium), and a cooling medium blown from the blow holes flows along the wall surface so as to cool the wall surface. In this film cooling structure, in order to suppress the separation of the cooling medium from the wall surface and to improve a film efficiency, blowing directions of cooling media from one pair or more pairs of blow holes are set so as to form swirls in directions in which the cooling media are mutually pressed against the wall surface.

Specifically, each pair of blow holes are arranged on the wall surface back and forth in a flow direction of high-temperature gas, and each blow hole is formed on the wall surface into an elliptical shape whose long axis is in the blowing direction of a cooling medium therefrom. Blowing speed vectors of the cooling media blown from the pair of blow holes have transverse angle components $\beta 1$ and $\beta 2$ on a plane along the wall surface with respect to the flow direction of the high-temperature gas, and the transverse angle components $\beta 1$ and $\beta 2$ are set to be different from each other.

DOCUMENT OF RELATED ART

Patent Document

[Patent Document 1] Japanese Patent Granted Publication No. 4147239

SUMMARY OF INVENTION

Technical Problem

In Patent Document 1, the cooling media from the pair of two blow holes interfere with each other so that the cooling media are pressed by one another onto the wall surface. Thereby, the separation of the cooling media from the wall surface is suppressed. Therefore, the film efficiency on the wall surface can be enhanced.

However, in the related art described above, the pressing action of the cooling media is obtained only in a range between the swirls of the cooling media, and thus a range where a high film efficiency is obtained may be narrow.

The present invention has been made in consideration of the above-described problems, and an object thereof is to provide a film cooling structure and a turbine blade which are capable of obtaining a high film efficiency in a wide range.

Solution to Problem

According to a first aspect of the present invention, a film cooling structure includes: a wall surface along which a heating medium flows; and at least one pair of film cooling holes that open at the wall surface and that are used to blow a cooling medium. The pair of film cooling holes are arranged to be adjacent to each other in a main flow direction of the heating medium. In addition, perforation directions of the pair of film cooling holes are set such that directions of swirls of the cooling medium formed by blowing are opposite to each other, a swirl of the cooling medium on a downstream side in the main flow direction is mixed and merged with another swirl of the cooling medium on an upstream side in the main flow direction, and the merged cooling medium flows along the wall surface in a direction intersecting with the main flow direction.

According to a second aspect of the present invention, in the film cooling structure of the first aspect, in the pair of film cooling holes, a perforation direction of a first cooling hole on the upstream side in the main flow direction is set in a first plane orthogonal to the main flow direction, and a perforation direction of a second cooling hole on the downstream side in the main flow direction is set in a second plane orthogonal to the main flow direction.

According to a third aspect of the present invention, in the film cooling structure of the second aspect, a first angle of the perforation direction of the first cooling hole with respect to the wall surface in the first plane is set to be different from a second angle of the perforation direction of the second cooling hole with respect to the wall surface in the second plane.

According to a fourth aspect of the present invention, in the film cooling structure of the third aspect, a difference between the first angle and the second angle is set within a range greater than 100° and less than 120°.

According to a fifth aspect of the present invention, in the film cooling structure of the fourth aspect, one of the first angle and the second angle is set within a range greater than 135° and less than 150°, and the other one of the first angle and the second angle is set within a range greater than 30° and less than 40°.

According to a sixth aspect of the present invention, in the film cooling structure of any one of the first to fifth aspects, the pair of film cooling holes are formed at positions different from each other in a direction which is orthogonal to the main flow direction and which is parallel to the wall surface.

According to a seventh aspect of the present invention, a turbine blade includes: the film cooling structure according to any one of the first to sixth aspects.

Effects of Invention

According to the present invention, a cooling medium blown from a film cooling hole on the downstream side passes under and is mixed with the swirl formed of a cooling medium blown from a film cooling hole on the upstream side, and the cooling media interfere with each other so as to be pressed and extended in a direction intersecting with the main direction.

Accordingly, according to the present invention, a high film efficiency can be obtained in a wide range.

DESCRIPTION OF EMBODIMENTS

Hereinafter, an embodiment of the present invention will be described with reference to the drawings. In the following description, an example in which a film cooling structure of the present invention is applied to a cooling structure for a turbine blade of a gas turbine is described.

Figure 1:
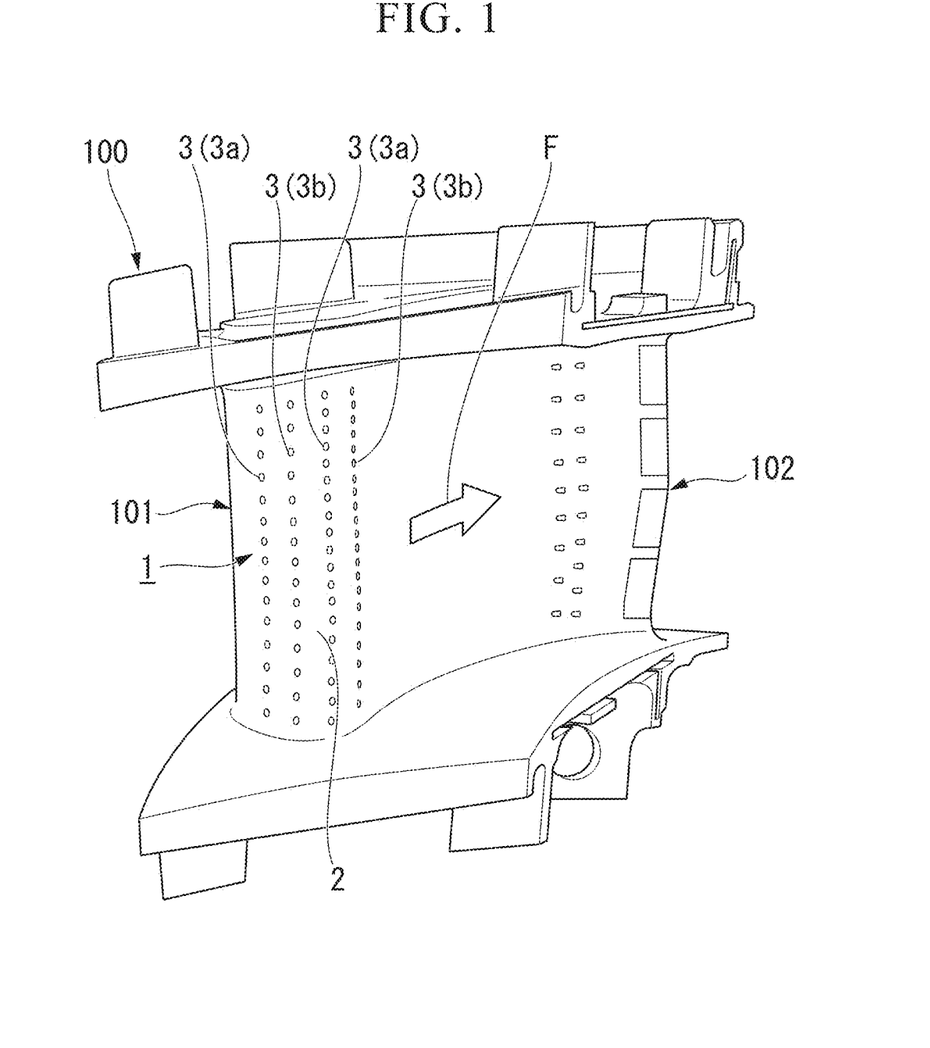
FIG. 1 is a perspective view illustrating a turbine blade according to an embodiment of the present invention.

FIG. 1 is a perspective view illustrating a turbine blade 100 according to an embodiment of the present invention.

As illustrated in FIG. 1, a front edge 101 of the turbine blade 100 is provided with a film cooling structure 1 of this embodiment. The film cooling structure 1 includes: a wall surface 2 along which a heating medium flows; and a plurality of film cooling holes 3 which open at the wall surface 2 and which are used to blow a cooling medium.

The heating medium is high-temperature combustion gas that is produced by a combustor (not illustrated). This heating medium flows along the wall surface 2 in a main flow direction from the front edge 101 toward a rear edge 102. The main flow direction of the heating medium is represented by reference sign F in the drawings of this embodiment.

The cooling medium is low-temperature compressed air that is supplied from a blade support component or the like (not illustrated) to which multiple turbine blades 100 are attached. The inside of the turbine blade 100 is hollow and is provided with a flow passageway (not illustrated), and the supplied cooling medium is blown from the film cooling holes 3.

Figure 2:
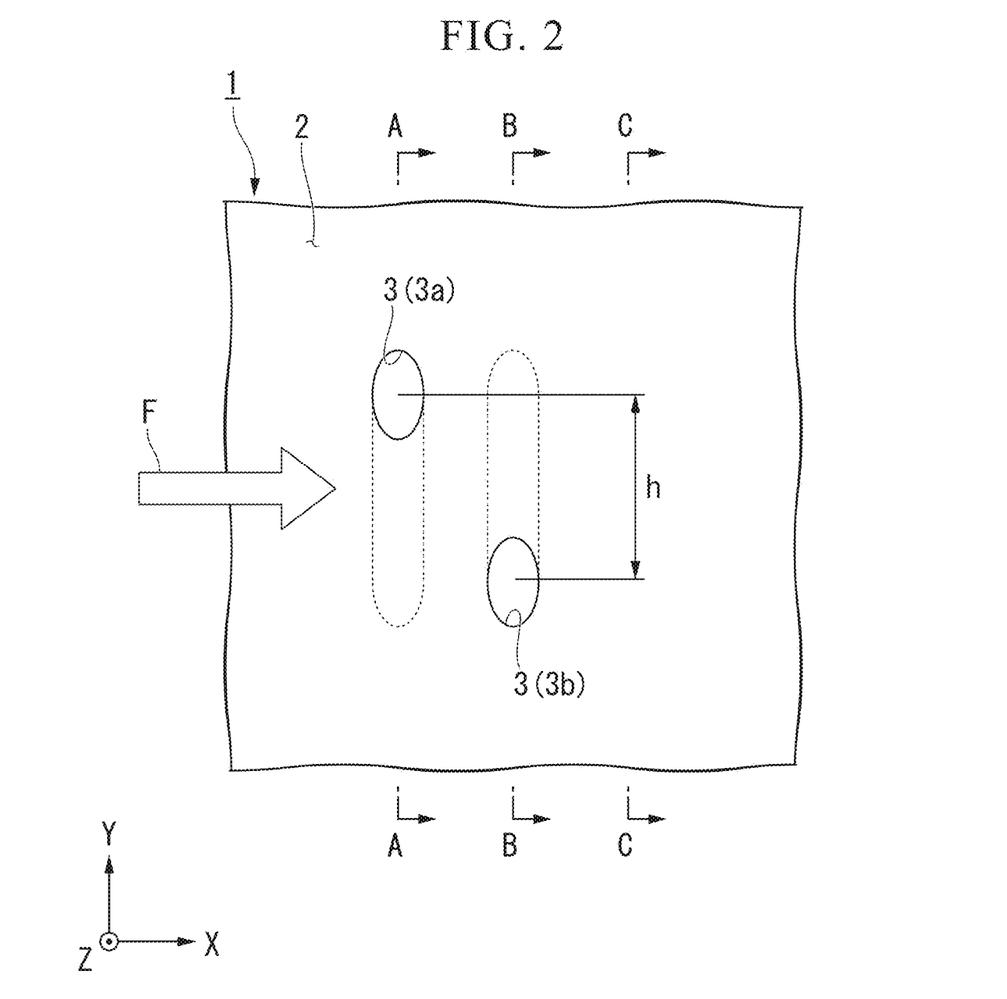
FIG. 2 is a plan view illustrating an arrangement of film cooling holes of a film cooling structure according to the embodiment of the present invention.
Figure 3:
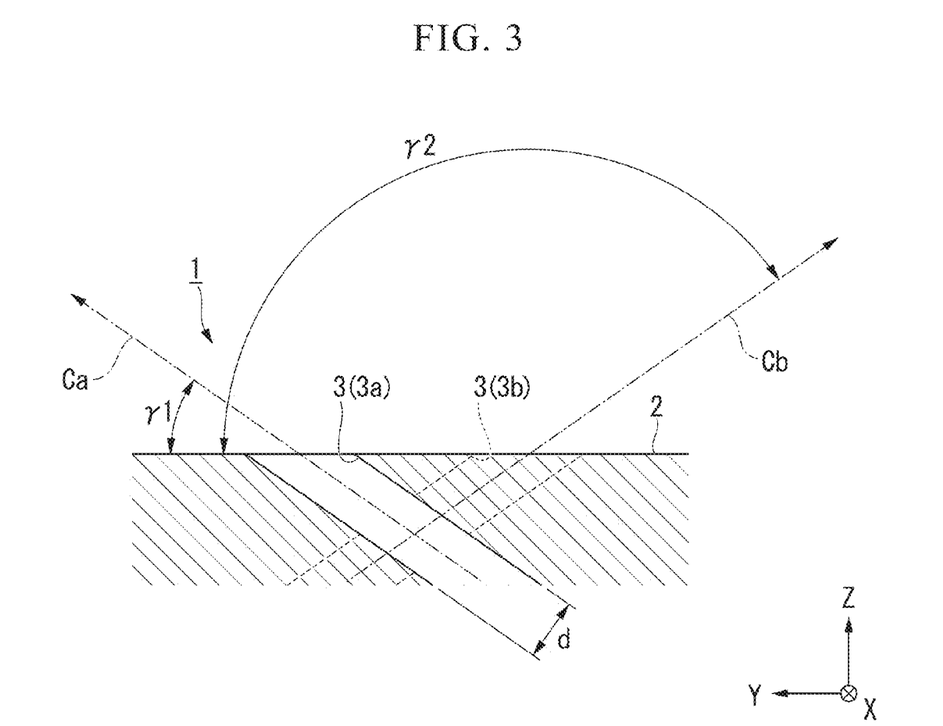
FIG. 3 is a cross-sectional view taken along arrow A-A line in FIG. 2.

FIG. 2 is a plan view illustrating an arrangement of the film cooling holes 3 of the film cooling structure 1 according to the embodiment of the present invention. FIG. 3 is a cross-sectional view taken along arrow A-A line in FIG. 2.

In the drawings of this embodiment, an X-axis direction represents the main flow direction of the heating medium, a Y-axis direction represents a direction (span (blade width) direction) orthogonal to the main flow direction of the heating medium, and a Z-axis direction represents a direction perpendicular to the X-Y plane (wall surface 2). That is, the Y-axis direction is a direction which is orthogonal to the main flow direction of the heating medium and which is parallel to the wall surface 2.

As illustrated in FIG. 2, on the wall surface 2, a pair of film cooling holes $3a$ and $3b$ (first cooling hole $3a$ and second cooling hole $3b$) are arranged to be adjacent to each other in the main flow direction (X-axis direction) of the heating medium. That is, the film cooling holes $3a$ and $3b$ are arranged at positions different from each other with a predetermined interval in the X-axis direction. In FIG. 2, the film cooling hole 3 on an upstream side (−X side) in the main flow direction is represented by reference numeral $3a$, and the film cooling hole 3 on a downstream side (+X side) in the main flow direction is represented by reference numeral $3b$. The film cooling holes $3a$ and $3b$ are formed at positions different from each other with a distance h in the Y-axis direction. Specifically, the film cooling hole $3a$ on the upstream side is arranged to be shifted toward a +Y side, and the film cooling hole $3b$ on the downstream side is arranged to be shifted toward a −Y side, so that they are alternately arranged.

Figure 4A:
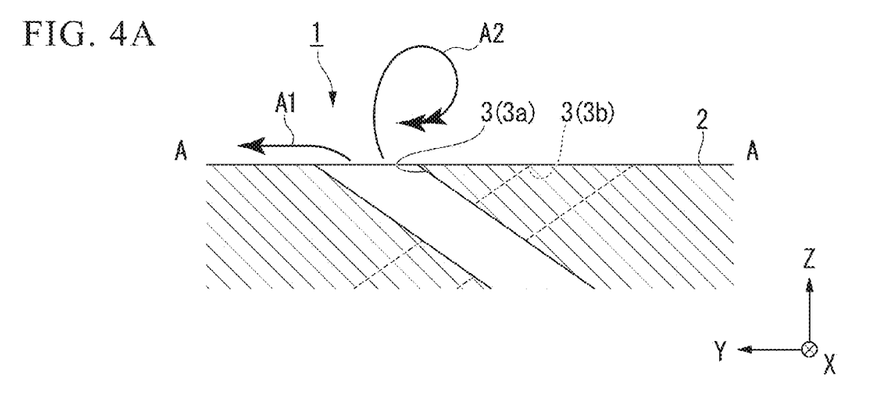
FIG. 4A is a schematic diagram illustrating a flow of a cooling medium in a cross-section taken along arrow A-A line of FIG. 2.
Figure 4B:
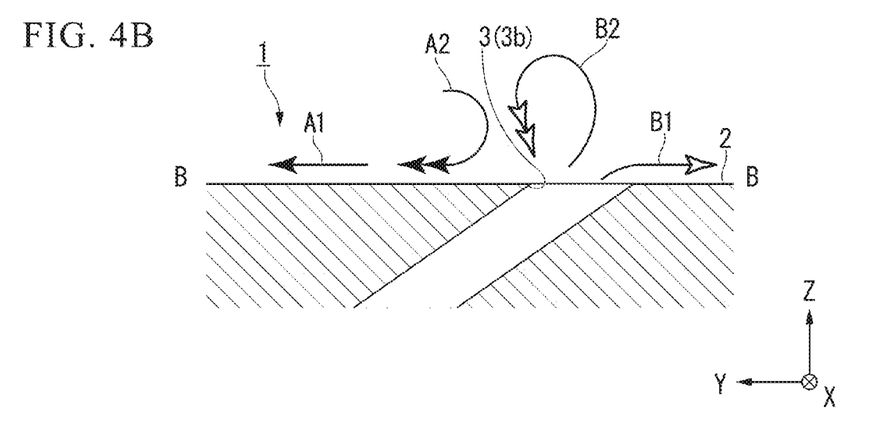
FIG. 4B is a schematic diagram illustrating a flow of a cooling medium in a cross-section taken along arrow B-B line of FIG. 2.
Figure 4C:
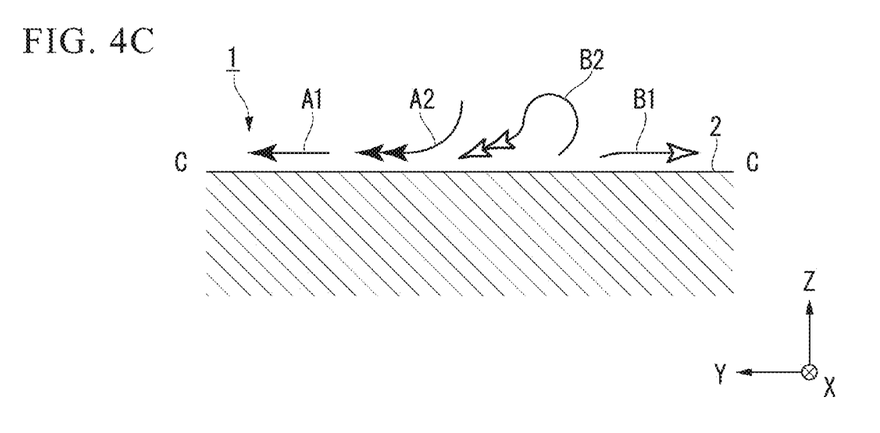
FIG. 4C is a schematic diagram illustrating a flow of a cooling medium in a cross-section taken along arrow C-C line of FIG. 2.

As illustrated in FIGS. 4A to 4C described below, perforation directions (indicated by arrows in FIG. 3) of the film cooling holes $3a$ and $3b$ which are adjacent to each other in the main flow direction of the heating medium are set such that directions of swirls of the cooling medium formed by the above-described blowing are opposite to each other, a swirl (represented by reference numeral B2) of the cooling medium on the downstream side in the main flow direction is mixed and merged with another swirl (represented by reference numeral A2) of the cooling medium on the upstream side in the main flow direction, and the merged cooling medium flows along the wall surface 2 in a direction intersecting with the main flow direction.

Specifically, as illustrated in FIG. 3, the perforation directions of film cooling holes $3a$ and $3b$ adjacent in the main direction of the heating medium are set in planes (Y-Z planes) orthogonal to the main flow direction. That is, the perforation direction of the film cooling hole $3a$ (first cooling hole $3a$) is set in a first plane (not illustrated) orthogonal to the main flow direction, and the perforation direction of the film cooling hole $3b$ (second cooling hole $3b$) is set in a second plane (not illustrated) orthogonal to the main flow direction. The film cooling holes $3a$ and $3b$ are formed to be slanting to the wall surface 2 such that they cross each other at the inside of the wall surface 2 when seen from the main flow direction. Each of the film cooling holes $3a$ and $3b$ has a diameter d. Each opening of the film cooling holes $3a$ and $3b$ is formed into an elliptical shape whose long axis is in the Y-axis direction in the plan view illustrated in FIG. 2.

In addition, as illustrated in FIG. 3, in the film cooling holes $3a$ and $3b$ adjacent to each other in the main flow direction of the heating medium, a first angle $\gamma 1$ of the perforation direction of the film cooling hole $3a$ (first cooling hole $3a$) on the upstream side in the main flow direction with respect to the wall surface 2 in the Y-Z plane (first plane) is set to be different from a second angle $\gamma 2$ of the perforation direction of the film cooling hole $3b$ (second cooling hole $3b$) on the downstream side in the main flow direction with respect to the wall surface 2 in the Y-Z plane (second plane).

In this embodiment, the first angle $\gamma 1$ is an angle between the perforation direction of the film cooling hole $3a$ (or a central axis Ca of the film cooling hole $3a$) and the wall surface 2 and is also an angle on one side in the Y-axis direction (downstream side in a flow direction of the cooling medium blown from the film cooling hole $3a$ in FIG. 3). The second angle $\gamma 2$ is an angle between the perforation direction of the film cooling hole $3b$ (or a central axis Cb of the film cooling hole 3b) and the wall surface 2 and is also an angle on the above-described one side in the Y-axis direction. Accordingly, in this embodiment, as illustrated in FIG. 3, the first angle γ1 is set to be an acute angle, and the second angle γ2 is set to be an obtuse angle.

In other words, each of the first angle γ1 and the second angle γ2 is an angle on one side in the Y-axis direction. In addition, unlike this embodiment, the first angle γ1 may be set to be an obtuse angle, and the second angle γ2 is set to be an acute angle.

It is preferable that a difference between the first angle γ1 and the second angle γ2 be set within a range greater than 100° and less than 120°, irrespective of a magnitude relationship between the first angle γ1 and the second angle γ2. That is, when the difference between the first angle γ1 and the second angle γ2 is represented by Δ, Δ is expressed by the following expression.

$$\Delta = |\gamma 1 - \gamma 2| (\text{wherein, } 100 < \Delta < 120).$$

Further, it is more preferable that one of the first angle γ1 and the second angle γ2 be set within a range greater than 135° and less than 150°, and the other one of the first angle γ1 and the second angle γ2 be set within a range greater than 30° and less than 40°. That is, as more preferable cases, the first angle γ1 and the second angle γ2 are expressed by the following two expressions.

$$135 < \gamma 1 < 150 \text{ and } 30 < \gamma 2 < 40 \quad \text{Case 1}$$

$$30 < \gamma 1 < 40 \text{ and } 135 < \gamma 2 < 150 \quad \text{Case 2}$$

A plurality of film cooling holes 3a on the upstream side and a plurality of film cooling holes 3b on the downstream side are formed in the span direction (Y-axis direction) so as to form a pair of lines (refer to FIG. 1). The above-described relationships between the film cooling holes 3a and 3b are set in each line. That is, the plurality of film cooling holes 3 (3a or 3b) composing one line are formed with the same inclination and have the above-described relationships compared to an adjacent line. In FIG. 1, lines in the span direction composed of the plurality of film cooling holes 3 are arranged in the main flow direction (X-axis direction). In this case, film cooling holes 3 in a pair of lines adjacent to each other in the main flow direction have the above-described relationships.

Next, the operation of the film cooling structure 1 having the above-described configuration will be described with reference to FIGS. 4A to 4C.

FIGS. 4A to 4C are diagrams to explain the operation of the film cooling structure 1 according to the embodiment of the present invention. FIG. 4A illustrates a flow of a cooling medium in the cross-section taken along arrow A-A line of FIG. 2, FIG. 4B illustrates a flow of a cooling medium in the cross-section taken along arrow B-B line of FIG. 2, and FIG. 4C illustrates a flow of a cooling medium in the cross-section taken along arrow C-C line of FIG. 2.

Along the wall surface 2, the heating medium flows in the X-axis direction (depth direction in FIGS. 4A to 4C). Roughly, the cooling medium blown from the film cooling hole 3a on the upstream side forms a flow represented by reference numeral A1 and a flow represented by reference numeral A2. The flow A1 flows along the wall surface 2 and is a flow toward the +Y side in a direction according to the perforation direction (direction of the inclination) of the film cooling hole 3a. On the other hand, the flow A2 is a swirl formed by the blowing of the cooling medium and is a flow toward the −Y side in a direction opposite to the perforation direction of the film cooling hole 3a. As illustrated in FIG. 4A, the flow A2 is a swirl that flows clockwise.

As illustrated in FIG. 413, roughly the cooling medium blown from the film cooling hole 3b on the downstream side also forms a flow represented by reference numeral B1 and a flow represented by reference numeral B2. However, directions of the flows 131 and B2 on the downstream side are opposite to those of the flows A1 and A2 on the upstream side. That is, the flow B1 flows along the wall surface 2 and is a flow toward the −Y side in a direction according to the perforation direction (direction of the inclination) of the film cooling hole 3b. On the other hand, the flow B2 is a swirl formed by the blowing of the cooling medium and is a flow toward the +Y side in a direction opposite to the perforation direction of the film cooling hole 3b. As illustrated in FIG. 4B, the flow B2 is a swirl that flows counterclockwise.

The flows A2 and B2 flow toward the downstream side along with the flow of the heating medium in the main flow direction and, as illustrated in FIG. 4C, interfere with each other in the cross-section taken along arrow C-C line on the downstream side. Regarding the flows A2 and B2 in which directions of swirls of the cooling medium are opposite to each other, the flow B2 on the downstream side in the main flow direction is mixed and merged with the swirl of the flow A2 flowed from the upstream side in the main flow direction, and the merged cooling medium flows along the wall surface 2 in a direction intersecting with the main flow direction (direction containing a component of the Y-axis direction). The reason is as follows. The cooling medium blown from the film cooling hole 3b on the downstream side extends so as to pass under the swirl of the flow A2 formed of the cooling medium blown from the film cooling hole 3a on the upstream side, and the cooling media interfere with each other so as to be pressed and extended in the span direction (Y-axis direction).

Figure 5:
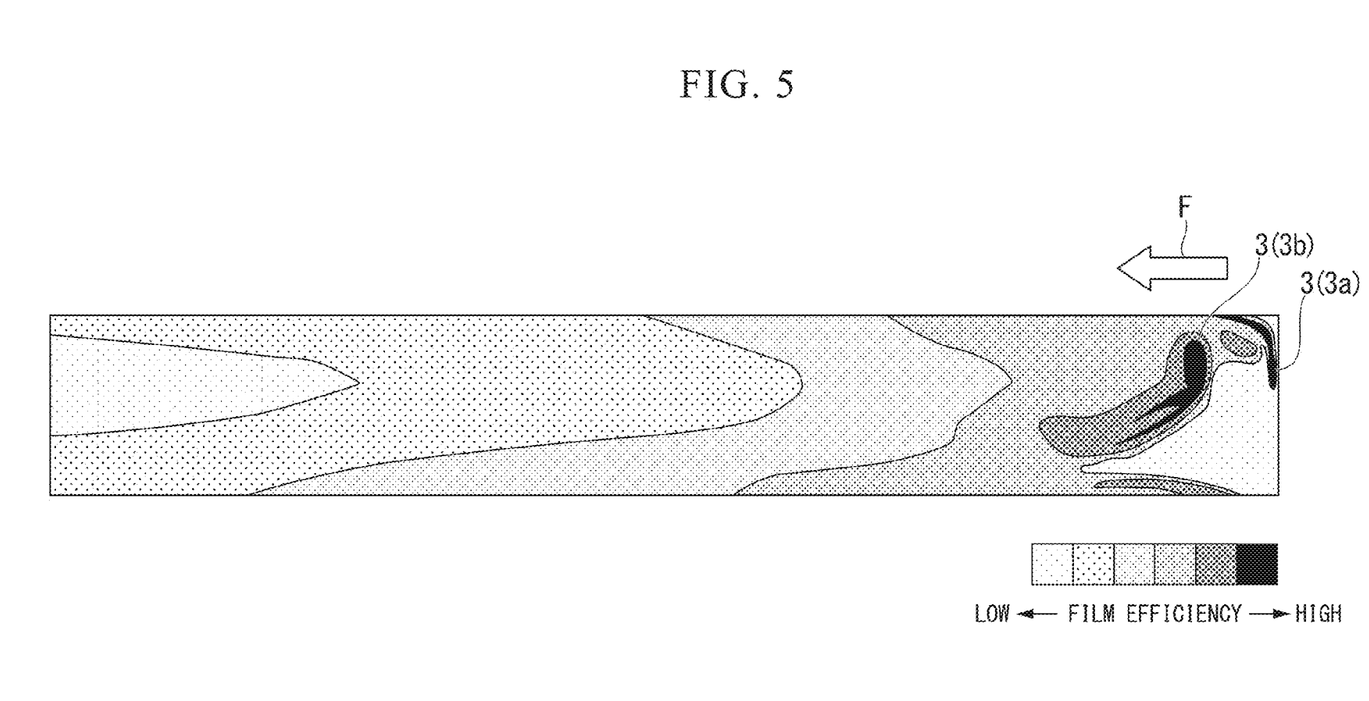
FIG. 5 is a diagram illustrating an analysis result of a film efficiency of the film cooling structure according to the embodiment of the present invention.

FIG. 5 is a diagram illustrating an analysis result of a film efficiency of the film cooling structure 1 according to the embodiment of the present invention. In FIG. 5, the main flow direction of the heating medium is a direction from the right side to the left side and is represented by reference numeral F. In addition, the level of a film efficiency is indicated by the gradation of a pattern, in which a dark pattern indicates a high efficiency.

As illustrated in FIG. 5, according to the film cooling structure 1 of this embodiment, the flow of the cooling medium blown from the film cooling hole 3a on the upstream side interferes with the flow of the cooling medium blown from the film cooling hole 3b on the downstream side. As a result, a high film efficiency can be obtained in a wide range of the wall surface 2.

As described above, according to the above-described embodiment, the film cooling structure 1 includes: the wall surface 2 along which a heating medium flows; and the film cooling holes 3 which open at the wall surface 2 and which blow a cooling medium, in which the perforation directions of the film cooling holes 3a and 3b adjacent to each other in the main flow direction (X-axis direction) of the heating medium are set such that directions of swirls of the cooling medium formed by the blowing are opposite to each other, the swirl (represented by reference numeral B2) of the cooling medium on the downstream side in the main flow direction is mixed and merged with the swirl (represented by reference numeral A2) of the cooling medium on the upstream side in the main flow direction, and the merged cooling medium flows along the wall surface 2 in a direction intersecting with the main flow direction. By adopting such a configuration, a high film efficiency is obtained in a wide range.

In addition, according to a turbine blade 100 including the film cooling structure 1 of this embodiment, since heat resistance is improved, improvement in performance and life can be realized.

EXAMPLE

Hereinafter, the effects of the present invention will be clarified using an example. The present invention is not limited to the following example, and modifications can be appropriately adopted within the scope of and not departing from the gist of the present invention.

Figure 6:
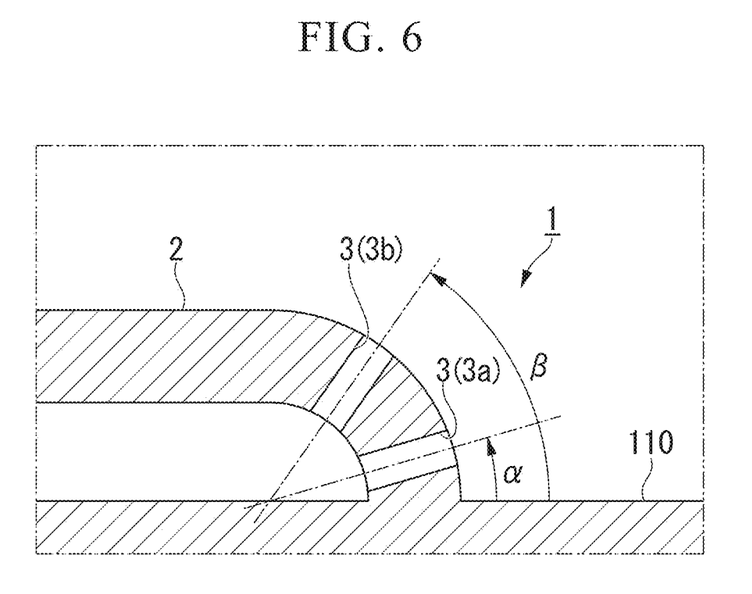
FIG. 6 is planar cross-sectional view illustrating an analysis model of a film cooling structure according to an example of the present invention.

FIG. 6 is a planar cross-sectional view illustrating an analysis model of the film cooling structure 1 according to this example.

As illustrated in FIG. 6, in this multidimensional analysis, a model in which the front edge 101 of the turbine blade 100 was simulated was used. In this multidimensional analysis, a half model of a substantially U-shaped model in a planar cross-sectional view was used. In FIG. 6, an angle of the film cooling hole 3a on the upstream side with respect to a reference surface 110 is represented by reference numeral a, and an angle of the film cooling hole 3b on the downstream side with respect to the reference surface 110 is represented by reference numeral 13.

This multidimensional analysis was carried out using five variables in total, the five variables including: one flow variable relating to the flow, that is, a blowing ratio (BR; mass flow rate of cooling flow/mass flow rate of main flow); and four design variables relating to shape (h/d, β, β1, and γ2). The respective conditions are as follows. α was fixed) (15°).

[Flow Condition]
BR . . . 0.5≤BR≤2.0
[Shape Condition]
h/d (refer to FIGS. 2 and 3) . . . 3.5≤h/d<10.5 (base condition: h/d=3.5)
β (refer to FIG. 6) . . . 39≤β≤90 (base condition: β=55°)
γ1 (refer to FIG. 3) . . . 10≤γ1 (base condition: γ1=45°)
γ2 (refer to FIG. 3) . . . γ2≤170 (base condition: γ2=45°)

Figure 7:
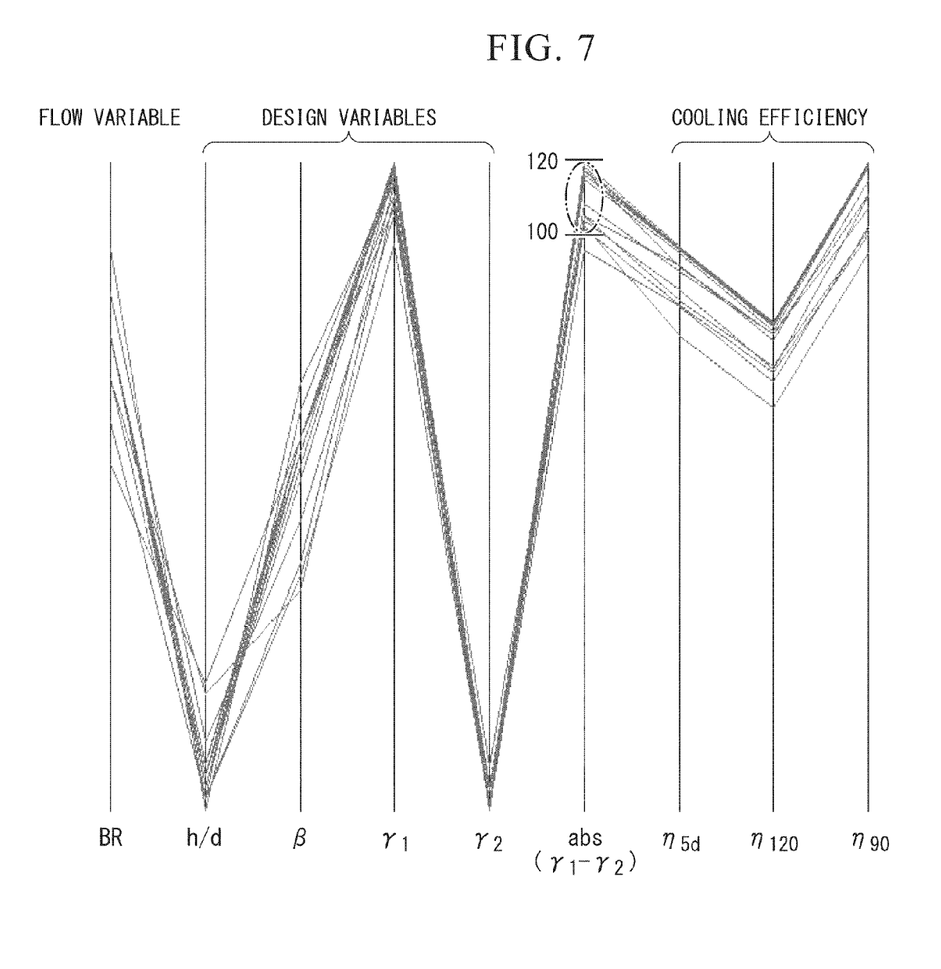
FIG. 7 is a graph illustrating a multidimensional analysis result in a case of $\gamma 1 > \gamma 2$ in the example.
Figure 8:
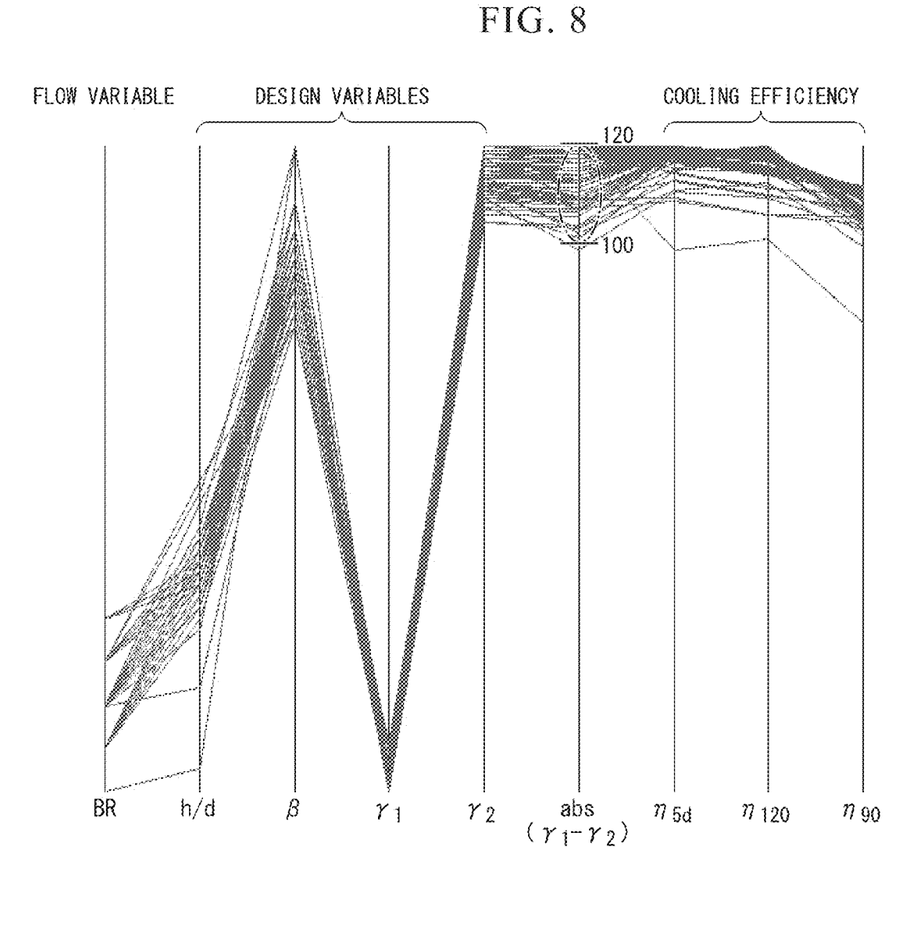
FIG. 8 is a graph illustrating a multidimensional analysis result in a case of $\gamma 1 < \gamma 2$ in the example.

FIG. 7 is a graph illustrating a multidimensional analysis result in a case of γ1>γ2 in this example. FIG. 8 is a graph illustrating a multidimensional analysis result in a case of γ1<γ2 in this example. In these two graphs, a value of each parameter is increased toward the upside of the drawing. In addition, the cooling efficiency (film efficiency) was evaluated at three predetermined positions ($\eta_{5d}$, $\eta_{120}$, $\eta_{90}$) of the wall surface 2.

As illustrated in FIG. 7, in the case where γ1>γ2, it was found that, when the shape condition (abs(γ1−γ2)) is in a range from 100° to 120°, a high film efficiency can be obtained even if the values of the other conditions (BR, h/d, and β) are set to be dispersed in a certain range.

In addition, as illustrated in FIG. 8, in the case where γ1<γ2 (opposite relationship), similarly, it was found that, when the shape condition (abs(γ1−γ2)) is in a range from 100° to 120°, a high film efficiency can be obtained even if the values of the other conditions (BR, h/d, and β) are set to be dispersed in a certain range.

In addition, in the multidimensional analysis, as a result of numerical analysis in which γ1 and γ2 were set in a conceivable angle range, the following was found. When one of the first angle γ1 and the second angle γ2 is set within a range greater than 135° and less than 150°, and the other one of the first angle γ1 and the second angle γ2 is set within a range greater than 30° and less than 40°, a higher effect can be obtained from the viewpoint of cooling efficiency.

According to the above-described example, it is preferable that a difference between the first angle γ1 and the second angle γ2 be set within a range greater than 100° and less than 120°. In addition, it is more preferable that one of the first angle γ1 and the second angle γ2 be set within a range greater than 135° and less than 150°; and that the other one of the first angle γ1 and the second angle γ2 be set within a range greater than 30° and less than 40°.

While a preferred embodiment of the present invention have been described with reference to the drawings, the present invention is not limited to the above embodiment. A shape, a combination, or the like of each component shown in the above-described embodiment is an example, and additions, omissions, substitutions, and other modifications of the configurations can be made based on the design requirements within the scope of and not departing from the gist of the present invention. The present invention is not limited by the foregoing description, and is only limited by the scope of the appended claims.

For example, in the above-described embodiment, the case where the film cooling structure 1 is applied to the cooling structure of the turbine blade 100 of a gas turbine have been exemplified. However, the present invention is not limited to this configuration and can be applied to, for example, another cooling structure of a liner of a combustor or the like.

In this embodiment, all the film cooling holes 3 satisfy the above-described relationships between the film cooling holes 3a and 3b. However, even when a plurality of film cooling holes 3 are provided, it is only necessary that at least one pair of film cooling holes 3a and 3b satisfy the above-described relationship. In addition, the cooling medium is not limited to compressed air, and another medium may be used therein. For example, low-temperature compressed inert gas (such as nitrogen) or oxygen may be used.

INDUSTRIAL APPLICABILITY

The present invention can be applied to a film cooling structure and a turbine blade.

REFERENCE SIGNS LIST

1 FILM COOLING STRUCTURE
2 WALL SURFACE
3 FILM COOLING HOLE
3A FILM COOLING HOLE (FIRST COOLING HOLE)
3B FILM COOLING HOLE (SECOND COOLING HOLE)
A1 FLOW
A2 FLOW (SWIRL ON THE UPSTREAM SIDE)
B1 FLOW
B2 FLOW (SWIRL ON THE DOWNSTREAM SIDE)
γ1 FIRST ANGLE
γ2 SECOND ANGLE
100 TURBINE BLADE

The invention claimed is:
1. A film cooling structure comprising:
a wall surface along which a heating medium flows; and
at least one pair of film cooling holes that open at the wall surface and that are used to blow a cooling medium,
wherein the pair of film cooling holes are arranged to be adjacent to each other in a first direction in which the heating medium flows along the wall surface, wherein openings of the pair of film cooling holes at the wall surface are arranged at different positions in the first direction and in a second direction that is orthogonal to the first direction and is parallel to the wall surface, wherein each of the film cooling holes is configured to direct the cooling medium into a side thereof opposite to the other of the film cooling holes in the second direction, wherein perforation directions of the pair of film cooling holes are set such that directions of swirls of the cooling medium formed by blowing are opposite to each other, a swirl of the cooling medium on a downstream side in the first direction is mixed and merged with another swirl of the cooling medium on an upstream side in the first direction, and the merged cooling medium flows along the wall surface in a direction intersecting with the first direction, and wherein in the pair of film cooling holes, a perforation direction of a first cooling hole on the upstream side in the first direction is set to be orthogonal to the first direction, and a perforation direction of a second cooling hole on the downstream side in the first direction is set to be orthogonal to the first direction.

2. The film cooling structure according to claim 1, wherein a first angle of the perforation direction of the first cooling hole with respect to the wall surface is set to be different from a second angle of the perforation direction of the second cooling hole with respect to the wall surface.

3. The film cooling structure according to claim 2, wherein the difference between the first angle and the second angle is set within a range greater than 100° and less than 120°.

4. The film cooling structure according to claim 2, wherein the first and second angles are set to satisfy conditions in which one of the first angle and the second angle is within a range greater than 135° and less than 150°, the other of the first angle and the second angle is within a range greater than 30° and less than 40°, and the difference between the first angle and the second angle is within a range greater than 100° and less than 120°.

5. A turbine blade comprising: the film cooling structure according to claim 1.

6. A turbine blade comprising: the film cooling structure according to claim 2.

7. A turbine blade comprising: the film cooling structure according to claim 3.

8. A turbine blade comprising: the film cooling structure according to claim 4.

* * * * *